(12) United States Patent
Couch et al.

(10) Patent No.: US 6,914,411 B2
(45) Date of Patent: Jul. 5, 2005

(54) POWER SUPPLY AND METHOD FOR CONTROLLING IT

(75) Inventors: Philip R. Couch, Honiton (GB); Robert M. Harman, Riner, VA (US); Alexander M Barry, Christiansburg, VA (US); Jerry W. Fleming, Vinton, VA (US)

(73) Assignee: IHS iMonitoring Inc., Englewood, CO (US)

( * ) Notice: Subject to any disclaimer, the term of this patent is extended or adjusted under 35 U.S.C. 154(b) by 70 days.

(21) Appl. No.: 10/440,416

(22) Filed: May 19, 2003

(65) Prior Publication Data

US 2004/0232878 A1 Nov. 25, 2004

(51) Int. Cl.$^7$ .............................................. H01M 10/46
(52) U.S. Cl. ...................................................... 320/101
(58) Field of Search ................................ 320/101, 103, 320/110, 113; 136/292, 293

(56) References Cited

U.S. PATENT DOCUMENTS

| | | | |
|---|---|---|---|
| 5,498,951 A | | 3/1996 | Okamura et al. |
| 5,594,313 A | | 1/1997 | Takeda |
| 5,747,967 A | * | 5/1998 | Muljadi et al. ............. 320/148 |
| 6,027,076 A | * | 2/2000 | Krause ................... 244/158 R |
| 6,166,515 A | * | 12/2000 | Barde et al. ................ 320/101 |
| 6,583,523 B1 | * | 6/2003 | Bhate .......................... 307/86 |
| 2001/0043050 A1 | | 11/2001 | Fisher, Jr. |
| 2002/0067143 A1 | | 6/2002 | Robinett et al. |
| 2002/0084767 A1 | | 7/2002 | Arai |

* cited by examiner

*Primary Examiner*—Edward H. Tso
(74) *Attorney, Agent, or Firm*—Townsend and Townsend and Crew LLP

(57) ABSTRACT

A self-powered apparatus includes a solar power cell, a battery, and a load. The load may include one or more load functions performed using power provided by one or both of the solar power cell and the battery. The inclusion of a battery permits the solar power cell to be sized much smaller than if the solar power cell was the only supply of power. A programmable controller selectively regulates power provided to one or more load functions and also selectively regulates whether one or both of the power cell and battery supplies the power. Switching circuitry, controlled by the programmable controller, selectively couples one or both of the battery and the solar cell to supply energy for powering the load. In a preferred example embodiment, the controller couples the battery and/or solar cell to charge a super capacitor, which then is selectively controlled to power the load. The programmable controller determines and prioritizes load function power requirements, and based thereon, determines which load functions will be powered based the priority of the load function requirements and the amount of power that can be supplied by the solar power cell as supplemented by the battery.

33 Claims, 5 Drawing Sheets

POWER SUPPLY AND METHOD FOR CONTROLLING IT

FIELD OF THE INVENTION

The present invention relates to a self-contained, renewable, electric power supply and to intelligently controlling such a power supply.

BACKGROUND AND SUMMARY OF THE INVENTION

Self-contained, renewable power sources, such as rechargeable batteries, solar cells, and the like, permit a variety of electronic products and other electronic applications to be remotely located and operated independently from large capacity power sources, e.g., the local power company. But there are limitations. Conventional batteries store only a finite charge. Typically, the smaller the battery, the smaller the stored charge. Although solar batteries can be recharged with solar energy from the sun, the power they delivered depends upon weather conditions, seasons, and latitude. Solar cells also tend to be quite large relative to the amount of power they deliver. Large size batteries and solar cells make them less attractive for smaller and/or less expensive devices/applications. It would be desirable to have a self-powered device that has a long useable life before the device requires power supply servicing or replacement. It would also be desirable to have a self-powered device that does not require large solar panels, oversized batteries, or too many batteries/solar cells.

Small, remote, self-powered devices typically have no or only rudimentary control functionality. As a result, there is no intelligent approach to controlling how and when power should be supplied or how and when a rechargeable power supply should be recharged. Nor is there an intelligent approach for controlling how power should be supplied to different power level requirements at the device that may have different levels of importance. Accordingly, it would be desirable to intelligently control how much and when power is supplied to various power level load requirements. Still further, it would be desirable for such a power supply to be responsive to different load conditions (e.g., a brief but high peak power requirement), different load priorities, and changing environmental conditions.

It is also desirable in some instances to have such devices be able to operate over a wide temperature range, wider than is normally achieved with rechargeable battery chemistries that typically do not accept much charge below freezing temperatures. It is further desirable in some instances that the power supply guarantee power availability all days of the year and over a long life without the need to change batteries. Furthermore, it is often desirable to miniaturize the power supply, but typical solar cells with sufficient energy capacity often limit the extent of miniaturization.

The present invention relates to a self-powered apparatus that includes a solar power cell, a battery, and a load. The load may include one or more load functions performed using power provided by one or both of the solar power cell and the battery. Inclusion of a battery permits the solar power cell to be sized much smaller than if the solar power cell was the only supply of power. Also, the inclusion of the small solar cell means that the battery can be much smaller than for an equivalent device powered only by a battery. A programmable controller selectively regulates power provided to one or more load functions and also selectively regulates whether one or both of the power cell and battery supplies the power. Switching circuitry, controlled by the programmable controller, selectively couples one or both of the battery and the solar cell to supply energy for powering the load. However, the switching circuitry can be controlled so that both the solar power cell and the battery supply power.

The programmable controller also determines and prioritizes load function power requirements, and based thereon, determines which load functions will be powered based the priority of the load function requirements and the amount of power that can be supplied by the solar power cell as supplemented by the battery. Preferably, the programmable controller generally provides a low quiescent, low voltage idle power when there is no load function to be performed. If there is insufficient power or insufficient stored energy for all load functions currently requiring power, then the programmable controller only powers higher priority and/or essential load functions. When neither the solar power cell nor the battery can supply enough energy to power essential load functions for the desired time period, the programmable controller gradually (rather than abruptly) degrades essential load functionality.

In another example embodiment, the solar cell and battery are coupled to charge an energy storage device, which then supplies power to the load under the control of the programmable controller. A preferred energy storage device is a super capacitor because of its tolerance of extreme temperatures. A lithium thionyl chloride battery is preferred because of its long life and its ability to function in very extreme temperatures. This example embodiment is able to operate in a temperature range of −40° to +60° centigrade. The solar power cell is mainly used to charge the super capacitor, with the battery being used as a backup for essential load functions. If the solar power cell is not supplying sufficient charge to the super capacitor, e.g., cloudy weather conditions, the battery is switched to charge the capacitor. Once the solar power cell can supply sufficient charge to the super capacitor, the battery may be switched out.

A capacitor charge detector detects the current capacitor charge and provides current charge amount to the programmable controller. The programmable controller may selectively regulate excess charge stored on the super capacitor by "dumping" it via a resistor coupled to ground, or if the battery is of the rechargeable type, to recharge the battery.

Charging the super capacitor to a relatively high level, rather than powering the load directly from the solar cell and/or battery, enables the device to provide a relatively high peak power to a high power load. One example of a high current load might be a radio transmission from a remote metering device to a central control, data gathering station.

The use of a solar power cell ensures long term, renewable, and self-contained powering of load functionality in a remote device. Supplementing the solar power cell with a battery permits considerable reduction of the solar cell size. Intelligent programmable control optimizes power supply as well as load functionality. The solar power cell, the super capacitor for solar power storage, and the supplemental battery provide a wide operational temperature range. The solar power cell and super capacitor storage provide most of the required energy with the battery supplementing any power gaps. The combination yields a power source ideal for outdoor, remote, electronically-controlled devices with very high availability, long life, wide operating temperature range, and small size.

BRIEF DESCRIPTION OF THE DRAWINGS

The foregoing and other objects, features, and advantages of the present invention may be more readily understood

DETAILED DESCRIPTION

In the following description, for purposes of explanation and not limitation, specific details are set forth, such as particular examples, hardware, techniques, etc. in order to provide a thorough understanding of the present invention. However, it Will be apparent to one skilled in the art that the present invention may be practiced in other embodiments that depart from these specific details. In other instances, detailed descriptions of well known methods, interfaces, devices, components, signaling, etc., are omitted so as not to obscure the description with unnecessary detail. Individual function blocks are shown in the Figures. Those skilled in the art will appreciate that the functions may be implemented using individual hardware circuits or components, using software functions in conjunction with a suitably programmed digital microprocessor or general purpose computer, using an application specific integrated circuit (ASIC), and/or using one or more digital signal processes (DSPs).

Figure 1:
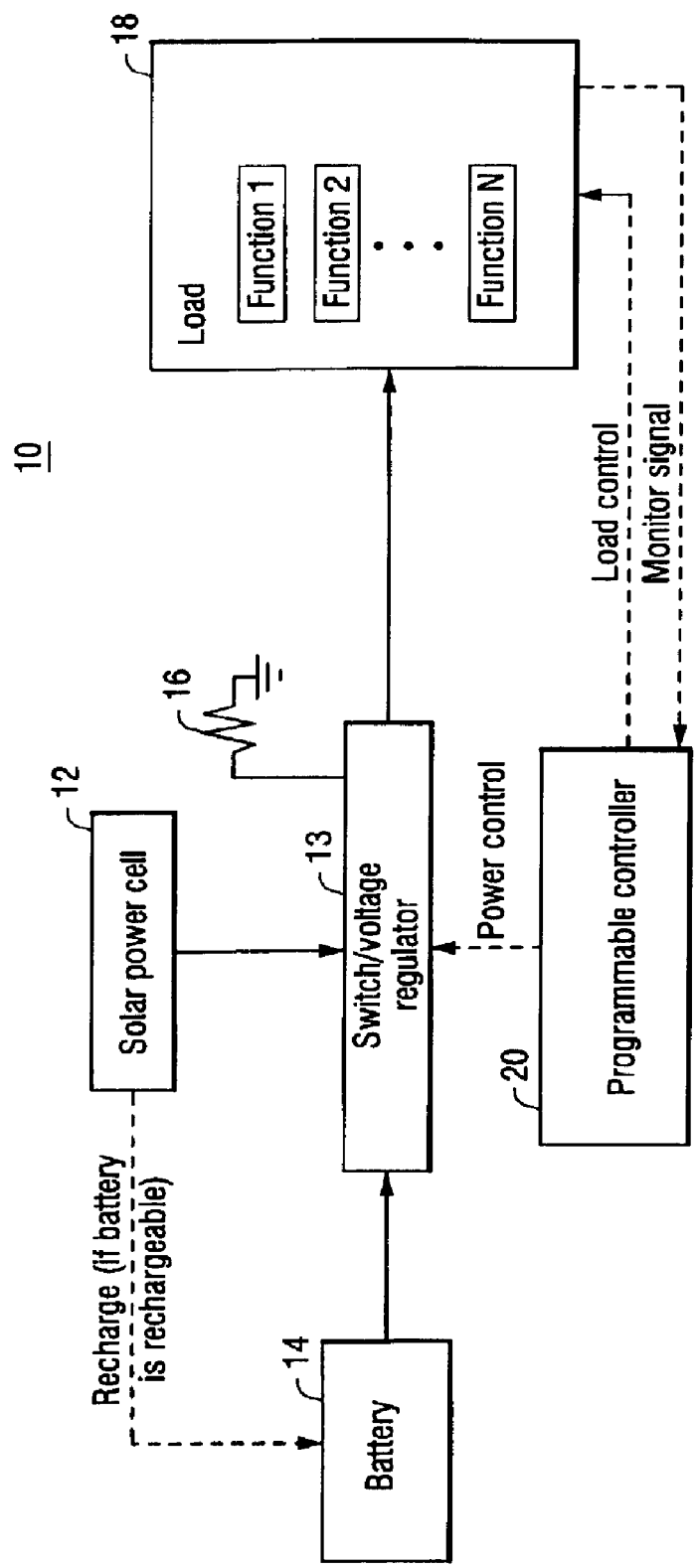
FIG. 1 illustrates in function block form an intelligent remote power supply in accordance with one example embodiment.

FIG. 1 illustrates a self-powered device 10 that may be used in any application or environment, but is particularly beneficial in low power, inexpensive, and relatively-small outdoor electronic devices. Both a solar power cell 12 and a conventional battery 14 are used as potential power sources in device 10. The battery 14 improves the overall reliability of the power supply when there is snow cover, extreme cloudiness, fallen debris on the solar cell, and other conditions that restrict solar recharging. The conventional battery 14 may be a primary type battery such as a lithium thionyl chloride battery. Alternatively, the battery may be of a rechargeable type, such as a NiCd battery.

The solar power cell 12 may be sized smaller than would otherwise be necessary without the support of the conventional battery 14. Absent the battery 14, the solar power cell 12 would need to be much larger to guarantee enough energy on all days for all load functions. In a preferred example implementation, a thin film solar cell is used because of its high efficiency at low light levels. The energy gathered on low light days determines the minimum size of the solar cells.

Both the power cell 12 and the battery 14 are coupled to a switch/voltage regulator 13. Voltage regulation may or may not be desirable. A load 18 is also coupled to the switch/regulator 13. In this non-limiting example, the load 18 includes multiple load functions 1, 2, ..., N. One or more of these functions may have a higher priority than the others. Indeed, one or more functions may even be viewed as essential. A charge dumping resistor 16 is coupled between ground and the switch/voltage regulator 13.

A programmable controller 20, such as a suitably programmed microprocessor, controls the device 10 in an optimal, intelligent fashion. One example controller is a low current programmable controller with an 8-bit data path. Given various load function requirements, the controller 20 preferably prioritizes them for powering. For example, non-essential functions would have a lower power priority than essential functions. Based on the charge condition of the solar power cell, the programmable controller 20 regulates one or more of the following: when power is supplied to the load, how much power is supplied to the load, and at what particular voltage or current level. One example way to implement such control is by sending a power control signal to the switch/voltage regulator 13 to regulate how much and how fast energy is drawn from the solar cell 12 and/or the battery 14.

The programmable controller 20 monitors the load 18 via one or more monitor signals to determine which functions need power. It also regulates via one or more load control signals which load functions will receive power. In the event that no load functions need power, the programmable controller (which is also powered via the switch/voltage regulator 26) turns off all load functions and switches to a low quiescent, low voltage idle mode in order to conserve power. The monitor signal is used to "wake up" the controller when a load function needs power.

A variety of power control procedures may be employed in a remote, self-powered device that employs at least a solar power cell and a battery to supply power to a load under intelligent control. In general, current (and if desired future) load function power requirements are determined. Priorities associated with those function power requirements are also determined. Based on the load function power requirement (s) and priorities for those functions, power supply and load control are optimized by the programmable controller 20.

Figure 2:
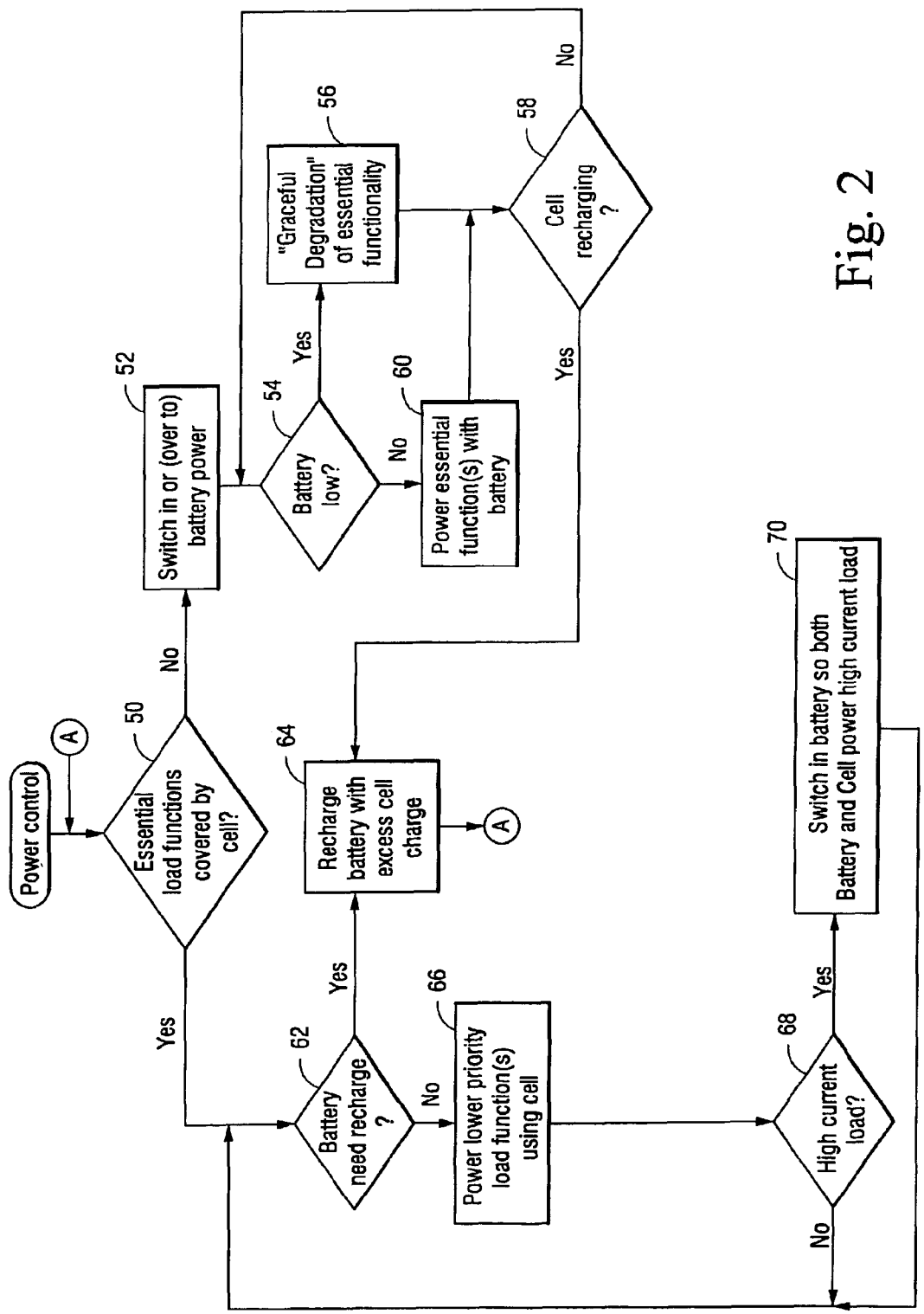
FIG. 2 illustrates a power control procedure in flowchart form.

One non-limiting, example set of power control procedures is illustrated in flowchart form in FIG. 2. A decision is made whether essential load functions can be powered with the current charge level and/or charging level in the solar cell (block 50). If not, the battery is switched in to supply power either directly or indirectly to the load (block 52). From block 52, a decision is made whether the battery charge level is low (block 54). The battery charge level may be detected or more likely simply calculated by the programmable controller based on its initial charge level and the amount of time that the battery has been providing power. If the battery charge level is low, a "graceful degradation" of essential functionality is implemented in the load using the remaining power level (block 56).

A decision is made whether the solar power cell is charging, and if so, at what rate (block 58); if the solar cell is not recharging, control returns to decision block 54. Otherwise, control moves to block 64 where an attempt may be made to recharge the battery (1) if it is a rechargeable battery and (2) if there is excess charge from the solar cell (block 64). Returning to decision block 54, if the battery charge level is not low, the battery is used directly or indirectly to power essential load functions (block 60) with control then proceeding to decision block 58 described above.

If essential load functions are covered by the solar cell in block 50, a decision is made whether the battery needs recharging in block 62, but only if the battery is of the rechargeable type. If those conditions are met, the solar cell recharges the battery (block 64) with control returning at flag A back to decision block 50. If the battery does not need recharging or is not a rechargeable battery, lower priority load functions are powered using the solar cell (block 62). A decision is made whether it is necessary to power a high current or voltage load (block 68). If so, the battery may be switched in so that both the battery and the solar power cell power the high current load (block 70). Control from block 70 and from the "No" path from block 68 returns to decision block 62.

Figure 3:
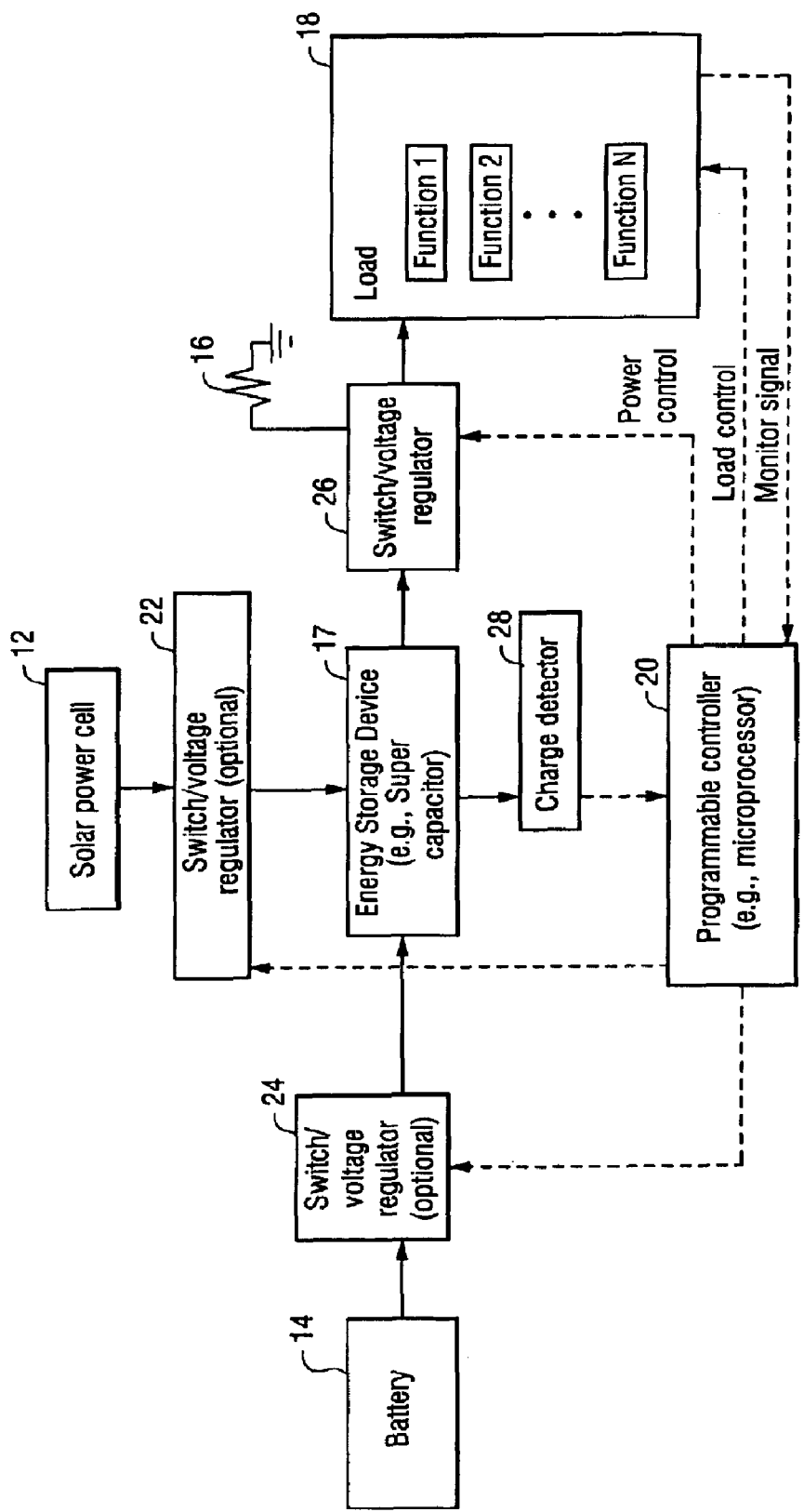
FIG. 3 illustrates in function block form an intelligent remote power supply in accordance with another example embodiment.

Another non-limiting, example embodiment is described in conjunction with FIG. 3 with like reference numerals referring to like elements from FIG. 1. The solar cell 12 and the battery 14 are coupled to charge an energy storage device 17. Preferably, the energy storage device is a super capacitor 17, although other energy storage devices may be used such as a rechargeable battery. For purposes of illustration only, the energy storage device 17 is referred to below as super capacitor 17. The super capacitor 17 has a wide temperature range and provides substantial pulse power, e.g., for occasional radio transmission in a remote metering application. Super capacitor 17 also can be recharged and discharged on the order of millions of times without losing it's ability to hold a full electrical charge.

In this example, the output of the solar power cell 12 may be voltage regulated in the switch/voltage regulator 22. The output of battery 14 may be optionally voltage regulated by the switch/voltage regulator 24 or by the switch/voltage regulator 22. Although the battery 14 is shown charging the super capacitor 16, it may be advantageous to couple the battery 14 directly or by way of the switch/voltage regulator 24 to the load to eliminate conversion losses in the capacitor 16. In this embodiment, it is assumed the battery is not rechargeable, and for example, may be a lithium thionyl chloride battery. A benefit of using a super capacitor and a lithium thionyl chloride battery is that the device in this particular example embodiment is able to operate in a temperature range of −40° to +60° centigrade. Moreover, the device can be miniaturized because the solar cell need not be oversized for an unlikely but still possible worst case scenario.

A charge detector 28 is coupled to the super capacitor 17 and provides a current charge level, and if desired, rate of charging level of the super capacitor 17 to the programmable controller 20. If excessive charge is stored on the super capacitor 17, it can be "dumped" to ground via the resistor 16.

Using power control signals to switch/voltage regulators 22 and 24, the programmable controller 20 selects one or both of the solar power cell 12 and battery 14 to supply power to charge super capacitor 17. The solar power cell 12 is used as the primary power source and the battery 14 as a back up power source. The battery 14 is switched in when the solar power cell 12 is unable to adequately charge the super capacitor 17. Power is selectively supplied from the super capacitor 17 to the load 18 through a switch/voltage regulator 26. In the event that neither the battery 114 nor the solar power cell 12 can adequately power all necessary functions, the controller 20 determines which function(s) will be powered, and if necessary, implements a "graceful degradation" of power supply to ensure that "bare bones" functionality is preserved for as long as possible.

The super capacitor 17 may also be charged up to deliver a relatively high peak power if a temporary high peak voltage/current is required. For example, if one of the device load functions is to send a radio transmission to a central data collection facility, the super capacitor 17 may be charged to a sufficient level to make such a radio transmission.

Figure 4:
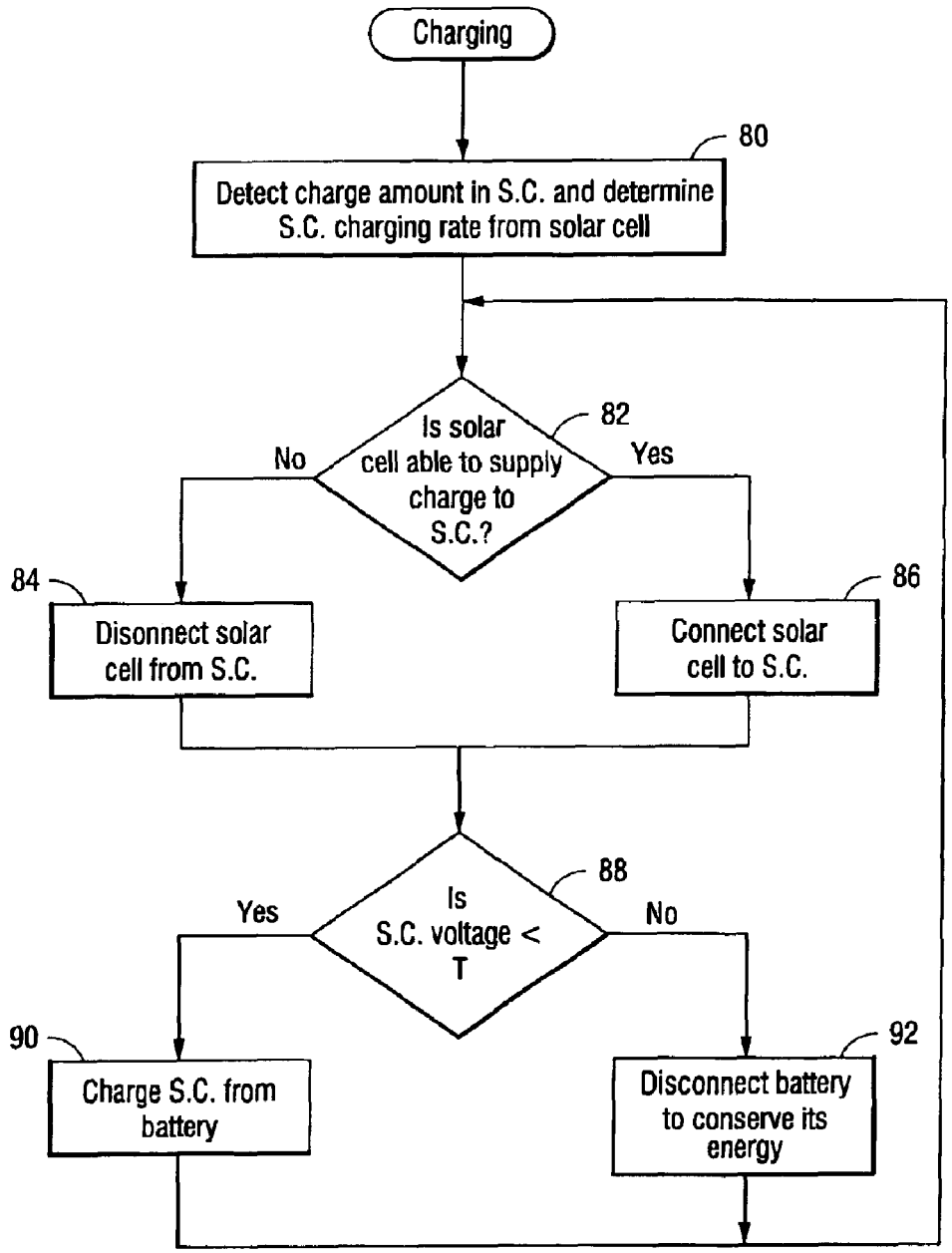
FIG. 4 is a flowchart that illustrates a non-limiting example of a charging routine related to the embodiment in FIG. 3.

Reference is now made to FIG. 4 which illustrates in flowchart form example charging procedures that may be employed with the example embodiment shown in FIG. 3. A charge amount in the super capacitor 17 is detected by the charge detector 28 and provided to the programmable controller 20, which may then calculate (if desired) a solar cell charging rate using multiple charge levels detected over a known time period. A decision is made (block 82) whether the solar cell 12 is able to supply charge to the super capacitor 17. If not, the solar cell 12 is disconnected from the super capacitor 17 (block 84); otherwise, the solar cell 12 is coupled to the super capacitor 17 (block 86). A decision is made (block 88) whether the super capacitor voltage is less than a threshold. If not, the battery 14 is disconnected from charging to conserve its energy (block 92); otherwise, the battery 14 is connected or maintained to charge the super capacitor 17 (block 90).

Figure 5:
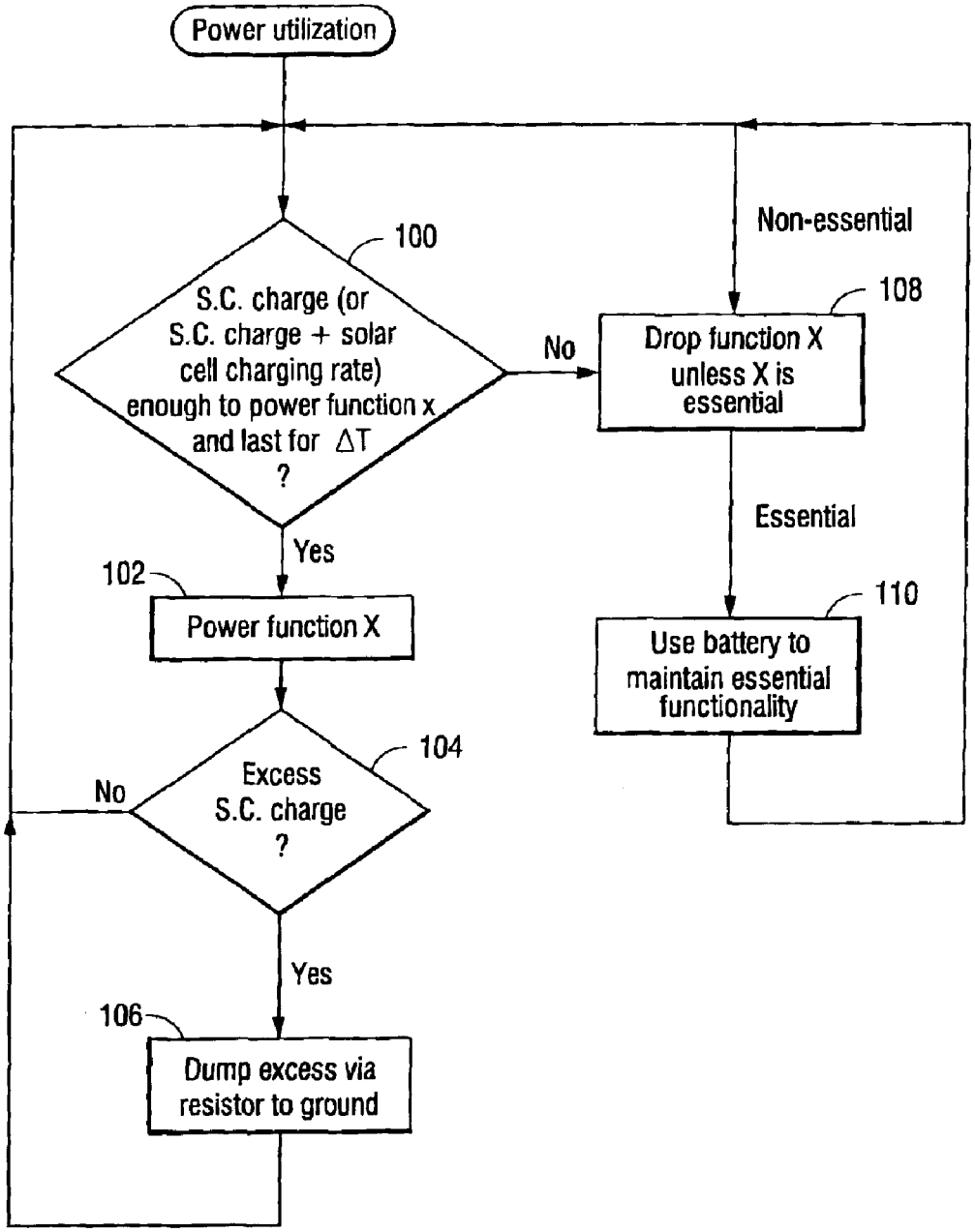
FIG. 5 is a flowchart that illustrates a non-limiting example of a power utilization routine related to the embodiment in FIG. 3.

Reference is now made to FIG. 5 which illustrates in flowchart form example power utilization procedures that may be employed with the example embodiment shown in FIG. 3. A decision is made (block 100) whether the current super capacitor charge level or charging rate or both is sufficient to power a particular load function X and to last for a specified time interval $\Delta T$. If not, that function X is not powered unless it is an essential function. If function X is essential, the battery 14 is used to maintain it, and control returns to block 100. If the super capacitor charge level or charging rate or both is sufficient to power a particular load function X and to last for a specified time interval $\Delta T$, function X is powered using the energy provided by the solar cell 12 to the super capacitor 17. If there is excess charge stored in the capacitor 17, it is dumped via the resistor 16 to ground, and control returns to block 100.

In this example embodiment, the battery level is not monitored, and the battery 14 powers only essential functions. The status of the device, including its charge status, may be reported via a radio communication. If the essential functions fail because of the battery is discharged, then the failed status is communicated the next time the device has enough power (probably from the solar cell having been sufficiently charged by the sun). In this example application of a radio-polled remote device, one example graceful degradation procedure may take into account a listening duty cycle of the device's radio receiver, (i.e., one of the load functions). Rather than having to power the radio receiver so that it is listening 24 hours 7 days a week, the receiver may be powered only periodically listening only briefly for a poll message. Such an approach saves power, but also causes delays for the polling entity. Preferably, this tradeoff is managed dynamically by the programmable controller 10 to maintain an optimal responsiveness at appropriate times. For example, it may be possible to significantly increase the duty cycle during limited periods when the polling device or person is expected to make the poll and dramatically decrease the duty cycle during all other times.

A miniature power source has been described with high availability over a wide range of environmental conditions, including a wide operating temperature range and over a wide range of solar conditions in terms of weather, seasonal changes, and Earth's latitude. While the description includes particular example embodiments, those skilled in the art will recognize that the present invention is not limited to these specific example embodiments. Different formats, embodiments, and adaptations besides those shown and described as well as many variations, modifications, and equivalent arrangements may also be used to implement the invention. It is intended that the invention be limited only by the scope of the claims appended hereto.

What is claimed is:

1. Apparatus for supplying power to a load comprising:
a solar power cell;
a battery;
a load including plural load functions; and
a programmable controller programmed to selectively regulate energy obtained from one or more of the solar power cell and the battery and to selectively control energy obtained from one or both of the solar power cell and the battery supplied to power one or more of the load functions.

2. The apparatus in claim 1, further comprising:
switching circuitry, under the control of the programmable controller, for selectively coupling energy from one or both of the solar power cell and the battery to power one or more of the load functions.

3. The apparatus in claim 1, wherein the battery is a lithium thionyl chloride battery.

4. Apparatus for supplying power to a load comprising:
a solar power cell;
a battery;
a load including plural load functions;
a programmable controller programmed to selectively regulate energy obtained from one or more of the solar power cell and the battery and to selectively control energy obtained from one or both of the solar power cell and the battery supplied to power one or more of the load functions; and
an energy storage device coupled to one or both of the solar power cell and the battery and to the load for storing energy supplied by one or both of the solar power cell and the battery under control of the programmable controller and for supplying energy to power one or more of the load functions under the control of the programmable controller.

5. The apparatus in claim 4, wherein the apparatus is operable in a temperature range of −40° to +60° Centigrade.

6. The apparatus in claim 4, further comprising:
switching circuitry under the control of the programmable controller for selectively coupling energy from one or both of the solar power cell and the battery to charge the energy storage device.

7. The apparatus in claim 4, wherein the energy storage device is a capacitor or a super capacitor.

8. The apparatus in claim 4, wherein the energy storage device is a rechargeable battery.

9. The apparatus in claim 4, further comprising:
an energy storage device detector for detecting a current energy level,
wherein the programmable controller is programmed to obtain the detected energy level.

10. The apparatus in claim 9, wherein the programmable controller is programmed to:
determine load function power requirements,
prioritize those load function power requirements, and
determine one or both of the load functions to be powered by the energy storage device based on one or more of the detected energy amount and on the priority of the current load function requirements.

11. The apparatus in claim 9, wherein the programmable controller is programmed to determine an energy charging rate of the energy storage device using plural detected energy levels over a predetermined period of time.

12. The apparatus in claim 11, wherein the programmable controller is programmed to:
determine load function power requirements,
prioritize those load function power requirements, and
determine one or more of the load functions to be powered by the energy storage device based on one or both of the energy charging rate and on the priority of the load function requirements.

13. Apparatus for supplying power to a load comprising:
a solar power cell;
a battery;
an energy storage device coupled to the solar cell and to the battery;
a load including one or more load functions;
switching circuitry for selectively coupling the battery to the energy storage device and the solar cell to the energy storage device; and
a programmable controller programmed to selectively regulate power drawn from the energy storage device by the one or more load functions and controlling the switching circuitry to couple one or both of the solar power cell and battery to charge the energy storage device.

14. The apparatus in claim 13, wherein the energy storage device is a super capacitor and the battery is a lithium thionyl chloride battery and wherein the apparatus is operable in a temperature range of −40° to +60° centigrade.

15. The apparatus in claim 13, wherein the programmable controller is programmed to control the switching circuitry so that the solar power cell is primarily used to charge the energy storage device and the battery is secondarily used to charge the energy storage device.

16. The apparatus in claim 13, wherein the programmable controller is programmed to control the switching circuitry so that the energy storage device stores sufficient energy to power a high current load.

17. The apparatus in claim 13, wherein the programmable controller is programmed to control the switching circuitry so that the battery supplies power to the energy storage device when the solar cell is not supplying sufficient charge to the energy storage device.

18. The apparatus in claim 17, wherein the programmable controller is programmed to de-activate non-essential load functions until the solar power cell can supply sufficient charge to the energy storage device.

19. The apparatus in claim 17, wherein the programmable controller is programmed to gradually degrade essential load functions when neither the solar power cell nor the battery can sufficiently charge the energy storage device to a level required to fully power the essential load functions.

20. The apparatus in claim 13, wherein battery is rechargeable and the programmable controller is programmed to control the switching circuitry to supply power from the solar power cell to recharge the rechargeable battery.

21. Apparatus in claim 13, further comprising one or more of the following:
a first voltage regulator coupled between the battery and the energy storage device;
a second voltage regulator coupled between the solar cell and the energy storage device; and
a third voltage regulator coupled between the energy storage, device and the load.

22. A computer-implemented method for use in a power supply apparatus including a solar power cell, a battery, an energy storage device coupled to the solar cell, the battery, and a load including one or more load functions performed using power stored in the capacitor, comprising:

detecting a charge level of the energy storage device, and selectively regulating power drawn from the energy storage device by the one or more load functions and whether one or both of the solar power cell and battery charges the energy storage device.

23. The method in claim 22, further comprising:

determining load function power requirements, prioritizing those load function power requirements, and determining one or more of the load functions to be powered by the energy storage device based on the detected charge level and the priority of the load function requirements.

24. The method in claim 22, further comprising:

determining current and future load function power requirements, prioritizing those current and future load function power requirements, and determining one or more of the current and future load functions to be powered by the energy storage device based on the detected charge level and the priority of the current and future load function requirements.

25. The method in claim 22, further comprising:

detecting an amount of charge stored in the battery.

26. The method in claim 25, further comprising:

determining load function power requirements, prioritizing those load function power requirements, and determining one or more of the load functions to be powered by the energy storage device based on the detected the detected charge level, the detected amount of charge in the battery, and the priority of the load function requirements.

27. The method in claim 22, further comprising:

determining a charging rate of the energy storage device by the solar power cell;

determining load function power requirements, prioritizing those load function power requirements, and determining one or more of the load functions to be powered by the capacitor based on the detected charge level, the charging rate, and the priority of the load function requirements.

28. The method in claim 22, further comprising:

selectively coupling the battery to the energy storage device and the solar cell to the energy storage device.

29. The method in claim 28, further comprising:

supplying power to the energy storage device from the battery to supply power when the solar cell is not supplying sufficient charge to the energy storage device.

30. The method in claim 29, further comprising:

ceasing supplying battery power to the energy storage device when the solar power cell can supply sufficient charge to the energy storage device.

31. The method in claim 22, further comprising:

de-activating non-essential load functions until the solar power cell can supply sufficient charge to the energy storage device.

32. The method in claim 31, further comprising:

gradually degrading essential load functions when neither the solar power cell nor the battery can sufficiently charge the capacitor to a level required to fully power the essential load functions.

33. The method in claim 22, further comprising:

supplying power from the solar power cell to recharge the battery.

\* \* \* \* \*